US009475220B2

(12) United States Patent
Jacobmeier et al.

(10) Patent No.: US 9,475,220 B2
(45) Date of Patent: Oct. 25, 2016

(54) PROCESS FOR PRODUCING COMPOSITE ELEMENTS

(71) Applicant: BASF SE, Ludwigshafen (DE)

(72) Inventors: Olaf Jacobmeier, Luebbecke (DE); Gunnar Kampf, Stemwede-Haldem (DE)

(73) Assignee: BASF SE, Ludwigshafen (DE)

( * ) Notice: Subject to any disclaimer, the term of this patent is extended or adjusted under 35 U.S.C. 154(b) by 78 days.

(21) Appl. No.: 14/176,366

(22) Filed: Feb. 10, 2014

(65) Prior Publication Data
US 2014/0227441 A1 Aug. 14, 2014

Related U.S. Application Data

(60) Provisional application No. 61/763,962, filed on Feb. 13, 2013.

(51) Int. Cl.
B29C 44/32 (2006.01)
C08J 9/08 (2006.01)
B29C 44/46 (2006.01)
B32B 15/04 (2006.01)
B32B 3/26 (2006.01)

(52) U.S. Cl.
CPC ............ *B29C 44/32* (2013.01); *B29C 44/461* (2013.01); *B32B 3/266* (2013.01); *B32B 15/046* (2013.01); *C08J 9/08* (2013.01); *B32B 2250/40* (2013.01); *B32B 2266/0278* (2013.01); *B32B 2419/00* (2013.01); *B32B 2509/10* (2013.01)

(58) Field of Classification Search
None
See application file for complete search history.

(56) References Cited

U.S. PATENT DOCUMENTS

| | | | |
|---|---|---|---|
| 2008/0234402 A1 | 9/2008 | Lehmann et al. | |
| 2010/0080900 A1* | 4/2010 | Geraedts et al. | 427/240 |
| 2011/0003082 A1 | 1/2011 | Schoen et al. | |
| 2012/0010313 A1* | 1/2012 | Tomovic et al. | 521/131 |
| 2012/0153210 A1 | 6/2012 | Glos et al. | |
| 2012/0214891 A1 | 8/2012 | Gehringer et al. | |
| 2012/0214892 A1 | 8/2012 | Kunst et al. | |
| 2012/0220677 A1* | 8/2012 | Williams et al. | 521/119 |
| 2012/0244303 A1 | 9/2012 | Tomasi et al. | |
| 2012/0264841 A1 | 10/2012 | Tomovic et al. | |
| 2012/0264842 A1 | 10/2012 | Tomovic et al. | |
| 2013/0184369 A1 | 7/2013 | Kampf | |
| 2013/0190419 A1 | 7/2013 | Kampf | |
| 2013/0231410 A1 | 9/2013 | Jacobmeier et al. | |
| 2013/0251975 A1 | 9/2013 | Kampf | |
| 2013/0324626 A1 | 12/2013 | Fabisiak et al. | |
| 2013/0324632 A1 | 12/2013 | Jacobmeier et al. | |
| 2014/0094531 A1 | 4/2014 | Kampf et al. | |

FOREIGN PATENT DOCUMENTS

| | | |
|---|---|---|
| DE | 10 2005 041 763 A1 | 3/2007 |
| DE | 20 2011 001 109 U1 | 4/2011 |
| DE | 10 2011 079 651 A1 | 1/2013 |
| EP | 2 465 891 A1 | 6/2012 |
| WO | WO 2009/077490 A2 | 6/2009 |
| WO | WO 2012/110585 A1 | 8/2012 |
| WO | WO 2012/113737 A1 | 8/2012 |
| WO | WO 2012/126916 A2 | 9/2012 |
| WO | WO 2012/140025 A1 | 10/2012 |
| WO | WO 2012/140150 A1 | 10/2012 |
| WO | WO 2013/102540 A1 | 7/2013 |
| WO | WO 2013/107573 A1 | 7/2013 |
| WO | WO 2013/127959 A1 | 9/2013 |
| WO | WO 2013/139781 A1 | 9/2013 |
| WO | WO 2013/178623 A1 | 12/2013 |
| WO | WO 2013/178657 A1 | 12/2013 |
| WO | WO 2014/048777 A1 | 4/2014 |
| WO | WO 2014/124824 A1 | 8/2014 |

OTHER PUBLICATIONS

European Search Report issued Jul. 17, 2013, in Application No. / Patent No. 13155029.5-1304.
U.S. Appl. No. 12/210,824, filed Mar. 14, 2014, Jacobmeier, et al.

\* cited by examiner

*Primary Examiner* — Shamim Ahmed
*Assistant Examiner* — Bradford Gates
(74) *Attorney, Agent, or Firm* — Oblon, McClelland, Maier & Neustadt, L.L.P.

(57) ABSTRACT

The invention relates to an improved process for producing composite elements comprising at least one outer layer and at least one isocyanate-based rigid foam layer by means of a fixed applicator apparatus and in which the flowable starting material comprises the following components: A) at least one polyisocyanate, B) at least one compound which reacts with isocyanate groups to form urethane, C) at least one blowing agent, D) catalysts comprising at least one compound D1) which catalyzes isocyanurate formation and at least one compound D2) which catalyzes polyurethane formation, comprising at least one amino group, and E) optionally auxiliaries and additives, where the manner of use of component A) and of component B) is such that the isocyanate index is at least 180, and where the ratio by weight of the compound D2) to the compound D1) is from 0.75 to 8.

16 Claims, No Drawings

PROCESS FOR PRODUCING COMPOSITE ELEMENTS

The invention relates to an improved process for producing composite elements comprising at least one outer layer and at least one isocyanate-based rigid foam layer by means of a fixed applicator apparatus and in which the flowable starting material comprises the following components: A) at least one polyisocyanate, B) at least one compound which reacts with isocyanate groups to form urethane, C) at least one blowing agent, D) catalysts comprising at least one compound D1) which catalyzes isocyanurate formation and at least one compound D2) which catalyzes polyurethane formation, comprising at least one amino group, and E) optionally auxiliaries and additives, where the manner of use of component A) and of component B) is such that the isocyanate index is at least 180, and where the ratio by weight of the compound D2) to the compound D1) is from 0.75 to 8.

Composite elements, often also termed sandwich elements, are nowadays produced on a large scale in continuously operating twin-belt systems, and are in particular made of metallic outer layers and of a core made of isocyanate-based foams, mostly polyurethane (PU) foams or polyisocyanurate (PIR) foams.

Elements for the construction of facades for a very wide variety of buildings are of constantly increasing significance, alongside sandwich elements for cold-store insulation. Outer layers used here are not only coated steel sheet but also stainless-steel sheet, copper sheet, or aluminum sheet. For a very wide variety of reasons, undesired air inclusions, known as cavities, often occur between the two outer layers and the isocyanate-based foam during production of sandwich elements. Particularly when large temperature changes occur and when dark color shades are used for the outer layer in the construction-element application, said air inclusions between the metal sheet and foam can cause bulging of areas of the metal sheet, and can render the wall visually unattractive.

Adhesion between the insulation foam and the outer layers is moreover reduced.

WO 2009/077490 describes a process for producing composite elements comprising at least one outer layer b) and at least one layer made of isocyanate-based rigid foam. Although this process provides rigid foam layers with a low level of surface defects (cavities) and with a good surface structure of the boundary between the foam and the adjacent outer layer, the surface structure of the foam is unsatisfactory.

It is therefore an object to develop a process which can produce rigid polyurethane foams and which provides longlasting minimization, or complete elimination, of cavity formation at the surface of the isocyanate-based rigid foams facing both toward the upper and toward the lower outer layer, and which thus gives foams with good adhesion and surface quality.

The object is achieved via a process for producing composite elements comprising at least one outer layer b) and at least one isocyanate-based rigid foam layer a) which is applied in the form of flowable starting material a*) to the outer layer b), while the outer layer b) is moved continuously, where the application is achieved by means of a fixed applicator apparatus c), which comprises using the following components comprised in the starting material a*):
A) at least one polyisocyanate,
B) at least one compound which reacts with isocyanate groups to form urethane,
C) at least one blowing agent,
D) catalysts comprising at least one compound D1) which catalyzes isocyanurate formation and at least one compound D2) which catalyzes polyurethane formation and which differs from the compound D1), and
E) optionally auxiliaries and additives,
where compound D2) comprises at least one amino group, the manner of use of component A) and of component B) to E) is such that the ioscyanate index is at least 180, and the ratio by weight of the compound D2) to the compound D1) is from 0.75 to 8.

The invention is explained in more detail hereinafter. Combinations of preferred embodiments are within the scope of the present invention. This is particularly true in relation to the embodiments characterized as preferred for the individual components A) to E) of the present invention, and in relation to the combination of preferred components A) to E) with preferred embodiments of the application process.

Component A

For the purposes of the present invention, the term polyisocyanate means an organic compound which comprises at least two reactive isocyanate groups per molecule, i.e. the functionality is at least 2. To the extent that the polyisocyanates used, or a mixture of a plurality of polyisocyanates, do/does not have uniform functionality, the number-average functionality of component A) used is at least 2.

Polyisocyanates A) that can be used are the aliphatic, cycloaliphatic, and araliphatic polyisocyanates known per se, and preferably the aromatic polyfunctional isocyanates. Polyfunctional isocyanates of this type are known per se or can be produced by methods known per se. The polyfunctional isocyanates can in particular also be used in the form of mixtures, and in this case component A) comprises various polyfunctional isocyanates. Polyfunctional isocyanates that can be used as polyisocyanate have two (these compounds being termed diisocyanates hereinafter) or more than two isocyanate groups per molecule.

The following individual compounds may in particular be mentioned: alkylene diisocyanates having from 4 to 12 carbon atoms in the alkylene moiety, for example dodecane 1,12-diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates, such as cyclohexane 1,3- and 1,4-diisocyanate, and also any desired mixtures of said isomers, 1-isocyanato-3,3,5-trimethyl-5-isocyanatomethylcyclohexane (IPDI), hexahydrotolylene 2,4- and 2,6-diisocyanate, and also the corresponding isomer mixtures, dicyclohexylmethane 4,4'-, 2,2'-, and 2,4'-diisocyanate, and also the corresponding isomer mixtures, and preferably aromatic polyisocyanates, such as tolylene 2,4- and 2,6-diisocyanate and the corresponding isomer mixtures, diphenylmethane 4,4'-, 2,4'-, and 2,2'-diisocyanate and the corresponding isomer mixtures, mixtures of diphenylmethane 4,4'- and 2,2'-diisocyanates, polyphenyl polymethylene polyisocyanates, mixtures of diphenylmethane 4,4'-, 2,4'-, and 2,2'-diisocyanates and of polyphenyl polymethylene polyisocyanates (crude MDI), and mixtures of crude MDI and of tolylene diisocyanates.

In particular, suitable compounds are diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, 1,2-diphenylethane diisocyanate, and/or p-phenylene diisocyanate (PPDI), tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate, and dicyclohexylmethane 4,4'-, 2,4'-, and/or 2,2'-diisocyanate.

The following embodiments are particularly preferred as polyisocyanates of component A):
i) polyfunctional isocyanates based on tolylene diisocyanate (TDI), in particular 2,4-TDI or 2,6-TDI, or a mixture of 2,4- and 2,6-TDI;
ii) polyfunctional isocyanates based on diphenylmethane diisocyanate (MDI), in particular 2,2'-MDI or 2,4'-MDI or 4,4'-MDI, or oligomeric MDI, which is also termed polyphenyl polymethylene isoyanate, or a mixture of two or three of the abovementioned diphenylmethane diisocyanates, or crude MDI, which arises during the production of MDI, or a mixture of at least one oligomer of MDI and of at least one of the abovementioned low-molecular-weight MDI derivatives;
iii) mixtures of at least one aromatic isocyanate of embodiment i) and of at least one aromatic isocyanate of embodiment ii).

Polymeric diphenylmethane diisocyanate is very particularly preferred as polyisocyanate. Polymeric diphenylmethane diisocyanate (hereinafter termed polymeric MDI) involves a mixture of binuclear MDI and of oligomeric condensates and thus of derivatives of diphenylmethane diisocyanate (MDI). The polyisocyanates can preferably also be composed of mixtures of monomeric aromatic diisocyanates and of polymeric MDI.

Polymeric MDI comprises, alongside binuclear MDI, one or more polynuclear condensates of MDI with a functionality of more than 2, in particular 3 or 4 or 5. Polymeric MDI is known and is often termed polyphenyl polymethylene isocyanate or else oligomeric MDI. Polymeric MDI is usually composed of a mixture of MDI-based isocyanates with different functionality. Polymeric MDI is usually used in a mixture with monomeric MDI.

The (average) functionality of a polyisocyanate which comprises polymeric MDI can vary in the range from about 2.2 to about 5, in particular from 2.3 to 4, in particular from 2.4 to 3.5. A particular mixture of this type comprising MDI-based polyfunctional isocyanates with different functionalities is crude MDI, which is obtained as intermediate during the production of MDI.

Polyfunctional isocyanates, and mixtures of a plurality of polyfunctional isocyanates, based on MDI, are known and are by way of example marketed as Lupranat® by BASF Polyurethanes GmbH.

The functionality of component A) is preferably at least two, in particular at least 2.2, and particularly preferably at least 2.4. The functionality of component A) is preferably from 2.2 to 4, and particularly preferably from 2.4 to 3.

The content of isocyanate groups in component A) is preferably from 5 to 10 mmol/g, in particular from 6 to 9 mmol/g, particularly preferably from 7 to 8.5 mmol/g. The person skilled in the art is aware that the content of isocyanate groups in mmol/g and what is known as the equivalent weight in g/equivalent have a reciprocal relationship. The content of isocyanate groups in mmol/g is obtained from the content in % by weight as in ASTM D-5155-96 A.

In one particularly preferred embodiment, component A) is composed of at least one polyfunctional isocyanate selected from diphenylmethane 4,4'-diisocyanate, diphenylmethane 2,4'-diisocyanate, diphenylmethane 2,2'-diisocyanate, and oligomeric diphenylmethane diisocyanate. For the purposes of this preferred embodiment, component (al) particularly preferably comprises oligomeric diphenylmethane diisocyanate, and has a functionality of at least 2.4.

The viscosity of component A) used can vary widely. The viscosity of component A) is preferably from 100 to 3000 mPa*s, particularly preferably from 200 to 2500 mPa*s.

Modified polyisocyanates are often also used, these being products which are obtained via chemical reaction of organic polyisocyanates, and which have at least two reactive isocyanate groups per molecule. Mention may in particular be made of polyisocyanates comprising ester, urea, biuret, allophanate, carbodiimide, isocyanurate, uretdione, carbamate, and/or urethane groups.

Examples of individual compounds that can be used are: organic, preferably aromatic polyisocyanates which comprise urethane groups and which have NCO contents of from 33.6 to 15% by weight, preferably from 31 to 21% by weight, based on the total weight, for example with low-molecular-weight diols, triols, dialkylene glycols, trialkylene glycols, or polyoxyalkylene glycols with molecular weights up to 6000, in particular with molecular weights up to 1500, modified diphenylmethane 4,4'-diisocyanate, modified diphenylmethane 4,4'- and 2,4'-diisocyanate mixtures, or modified crude MDI, or tolylene 2,4- and/or 2,6-diisocyanate, where the following may be mentioned by way of example as di- or polyoxyalkylene glycols which can be used individually or in the form of mixtures: diethylene and dipropylene glycol, polyoxyethylene, polyoxypropylene, and polyoxypropylene polyoxyethylene glycols, and corresponding triols and/or tetrols.

Other suitable compounds are prepolymers comprising NCO groups and having NCO contents of from 25 to 3.5% by weight, preferably from 21 to 14% by weight, based on the total weight, produced from the polyester polyols described hereinafter and/or preferably from the polyether polyols described hereinafter, and diphenylmethane 4,4'-diisocyanate, mixtures of diphenylmethane 2,4'- and 4,4'-diisocyanate, and of tolylene 2,4- and/or 2,6-diisocyanates, or crude MDI.

Other compounds that have proven successful are liquid polyisocyanates comprising carbodiimide groups and/or comprising isocyanurate rings and having NCO contents of from 33.6 to 15% by weight, preferably from 31 to 21% by weight, based on the total weight, e.g. based on diphenylmethane 4,4'-, 2,4'-, and/or 2,2'-diisocyanate and/or tolylene 2,4- and/or 2,6-diisocyanate.

The modified polyisocyanates can optionally be mixed with one another or with unmodified organic polyisocyanates, such as diphenylmethane 2,4'- or 4,4'-diisocyanate, crude MDI, or tolylene 2,4- and/or 2,6-diisocyanate. The following polyisocyanates have proven particularly successful and are preferably used: mixtures of tolylene diisocyanates and crude MDI, or mixtures of organic polyisocyanates comprising modified urethane groups and having NCO content of from 33.6 to 15% by weight, in particular those based on tolylene diisocyanates, on diphenylmethane 4,4'-diisocyanate, or on diphenylmethane diisocyanate isomer mixtures, or crude MDI, and in particular crude MDI with diphenylmethane diisocyanate isomer content of from 25 to 80% by weight, preferably from 30 to 55% by weight.

Component B

Component B) in the invention comprises at least one compound which reacts with isocyanate groups to form urethane. Compounds of this type are known per se to the person skilled in the art. In particular, component B) comprises at least one polyol, i.e. one compound having at least two hydroxy groups reactive toward isocyanates.

Compounds preferably used for component B) are polyester polyols B1) or a mixture of polyester polyols B1) and polyether polyols B2), and particular preference is given to mixtures of one or more polyester polyols B1) and of one or more polyether polyols B2).

Suitable polyester polyols B1) can by way of example be produced from organic dicarboxylic acids having from 2 to 12 carbon atoms, preferably aromatic dicarboxylic acids, or from mixtures of aromatic and aliphatic dicarboxylic acids, particularly preferably exclusively from aromatic dicarboxylic acids, and from polyhydric alcohols.

Particular dicarboxylic acids that can be used are: succinic acid, glutaric acid, adipic acid, suberic acid, azelaic acid, sebacic acid, decanedicarboxylic acid, maleic acid, fumaric acid, phthalis acid, isophthalic acid, and terephthalic acid. It is equally possible to use derivatives of these dicarboxylic acids, for example dimethyl terephthalate. The dicarboxylic acids here can be used either individually or else in a mixture. It is also possible to use the corresponding dicarboxylic acid derivatives instead of the free dicarboxylic acids, examples being dicarboxylic esters of alcohols having from 1 to 4 carbon atoms, or dicarboxylic anhydrides. Preferred aromatic dicarboxylic acids or aromatic dicarboxylic acid derivatives used are phthalic acid, phthalic anhydride, terephthalic acid, and/or isophthalic acid, in a mixture or alone, and it is preferable to use phthalic acid, phthalic anhydride, or terephthalic acid. It is particularly preferable to use terephthalic acid or dimethyl terephthalate, and specifically terephthalic acid. Preferred aliphatic dicarboxylic acids used are dicarboxylic acid mixtures of succinic, glutaric, and adipic acid in quantitative proportions which are by way of example from 20 to 35:from 35 to 50:from 20 to 32 parts by weight, and in particular adipic acid. Examples of di- and polyhydric alcohols are: ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, and pentaerythritol, and alkoxylates of these. It is preferable to use ethanediol, diethylene glycol, glycerol, trimethylolpropane, and pentaerythritol, or alkoxylates of these, or mixtures of at least two of the polyols mentioned. It is also possible to use polyester polyols made of lactones, e.g. ε-caprolactone, or of hydroxycarboxylic acids, e.g. ω-hydroxycaproic acid.

The further polyester polyols B1) can also be produced by using biologically based starting materials and/or derivatives of these, examples being castor oil, polyhydroxy fatty acids, ricinoleic acid, hydroxy-modified oils, grape seed oil, black cumin oil, pumpkin seed oil, borage seed oil, soybean oil, wheat germ oil, rapeseed oil, sunflower oil, peanut oil, apricot kernel oil, pistacchio nut oil, almond oil, olive oil, macadamia nut oil, avocado oil, sea buckthorn oil, sesame oil, hemp oil, hazelnut oil, evening primrose oil, wild rose oil, safflower oil, walnut oil, fatty acids, hydroxy-modified fatty acids, and fatty acid esters based on myristoleic acid, palmitoleic acid, oleic acid, vaccenic acid, petroselinic acid, gadoleic acid, erucic acid, nervonic acid, linoleic acid, α- and γ-linolenic acid, stearidonic acid, arachidonic acid, tinnodonic acid, clupanodonic acid, and cervonic acid.

The polyether polyols B2) can be produced by known processes, for example via anionic polymerization of one or more alkylene oxides having from 2 to 4 carbon atoms with alkali metal hydroxides, such as sodium hydroxide or potassium hydroxide, alkali metal alcoholates, such as sodium methoxide, sodium ethoxide or potassium ethoxide, or potassium isopropoxide, or aminic alkoxylation catalysts, such as dimethylethanolamine (DMEOA), imidazole, and/or imidazole derivatives, with use of at least one starter molecule which comprises from 2 to 8, preferably from 2 to 6, reactive hydrogen atoms, or via cationic polymerization with Lewis acids, such as antimony pentachloride, boron fluroide etherate, or bleaching earth.

Examples of suitable alkylene oxides are tetrahydrofuran, propylene 1,3-oxide, butylene 1,2- and 2,3-oxide, styrene oxide, and preferably ethylene oxide and propylene 1,2-oxide. The alkylene oxides can be used individually, in alternating succession, or else in the form of mixtures. Preferred alkylene oxides are propylene oxide and ethylene oxide, and particular preference is given to ethylene oxide.

Examples of starter molecules that can be used are: water, organic dicarboxylic acids, such as succinic acid, adipic acid, phthalic acid, and terephthalic acid, aliphatic and aromatic, optionally N-mono-, N,N- or N,N'-dialkyl-substituted diamines having from 1 to 4 carbon atoms in the alkyl moiety, for example optionally mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5-, and 1,6-hexamethylenediamine, phenylenediamines, 2,3-, 2,4-, and 2,6-tolylenediamine, and 4,4'-, 2,4'-, and 2,2'-diaminodiphenylmethane. Particular preference is given to the diprimary amines mentioned, e.g. ethylenediamine.

Starter molecules that can moreover be used are: alkanolamines, e.g. ethanolamine, N-methyl- and N-ethylethanolamine, dialkanolamines, e.g. diethanolamine, N-methyl- and N-ethyldiethanolamine, and trialkanolamines, e.g. triethanolamine, and ammonia.

It is preferable to use di- or polyhydric alcohols, such as ethanediol, 1,2- and 1,3-propanediol, diethylene glycol (DEG), dipropylene glycol, 1,4-butanediol, 1,6-hexanediol, glycerol, trimethylolpropane, pentaerythritol, sorbitol, and sucrose.

The polyether polyols B2), preferably polyoxypropylene polyols and polyoxyethylene polyols, particularly preferably polyoxyethylene polyols, have a functionality that is preferably from 2 to 6, particularly preferably from 2 to 4, in particular from 2 to 3, and specifically 2, and have number-average molar masses of from 150 to 3000 g/mol, preferably from 200 to 2000 g/mol, and in particular from 250 to 1000 g/mol.

In one preferred embodiment of the invention, an alkoxylated diol, preferably an ethoxylated diol, for example ethoxylated ethylene glycol, is used as polyether polyol B2), and it is preferable here that polyethylene glycol is involved.

In one specific embodiment of the invention, the polyetherol component B2) is composed exclusively of polyethylene glycol, preferably with a number-average molar mass of from 250 to 1000 g/mol.

In one particularly preferred embodiment, component B) comprises not only at least one polyesterol B1) but also at least one polyetherol B2). The ratio by weight of polyester polyol B1) to polyether polyol B2) here is preferably greater than 1, preferably greater than 2, particularly preferably greater than 4, and in particular greater than 5.5. At the same time, the ratio by weight of polyester polyol B1) to polyether polyol B2) is preferably smaller than 20, in particular smaller than 15.

Component C

Among blowing agents C) which are used to produce the rigid polyurethane foams are preferably water, formic acid, and mixtures thereof. These react with isocyanate groups to form carbon dioxide and in the case of formic acid to give carbon dioxide and carbon monoxide. These blowing agents release the gas via a chemical reaction with the isocyanate groups, and they are therefore termed chemical blowing agents. Physical blowing agents can be used alongside these, examples being low-boiling-point hydrocarbons. Particularly suitable materials are liquids which are inert to the polyisocyanates A) and have boiling points below 100° C., preferably below 50° C., at atmospheric pressure, and which therefore vaporize when exposed to the exothermic polyaddition reaction. Examples of liquids of this type that are preferred are ethers, such as furan, dimethyl ether, and diethyl ether, ketones, such as acetone and methyl ethyl ketone, alkyl carboxylates, such as methyl formate, dimethyl oxalate, and ethyl acetate, halogenated hydrocarbons, such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane, and heptafluoropropane, and (cyclo)alkanes, such as cyclopentane and/or cyclohexane, heptane, hexane, n- and isopentane, and preferably technical mixtures of n- and isopentanes, n- and isobutane, and propane. It is also possible to use mixtures of these low-boiling-point liquids with one another and/or with other substituted or unsubstituted hydrocarbons. Other suitable compounds are organic carboxylic acids, e.g. formic acid, acetic acid, oxalic acid, and ricinoleic acid, and carboxylated compounds.

It is preferable that no halogenated hydrocarbons are used as blowing agents. It is preferable to use water, formic-acid-water mixtures, or formic acid as chemical blowing agents, and particularly preferred chemical blowing agents are formic-acid-water mixtures and formic acid. It is preferable to use pentane isomers or mixtures of pentane isomers as physical blowing agents.

The chemical blowing agents here can be used alone, i.e. without addition of physical blowing agents, or together with physical blowing agents. It is preferable to use the chemical blowing agents together with physical blowing agents, and preference is given here to the use of formic-acid-water mixtures or pure formic acid together with pentane isomers or with mixtures of pentane isomers.

The blowing agents have either been dissolved completely or to some extent in the polyol component (i.e. B+C+D+E) or are metered directly into the system by way of a static mixer prior to foaming of the polyol component. In a usual procedure, water, formic acid-water mixtures, or formic acid take(s) the form of a complete or partial solution in the polyol component, and the physical blowing agent (for example pentane) and optionally the remainder of the chemical blowing agent is/are metered into the system "on-line".

The following are added to the polyol component in situ: pentane, possibly a portion of the chemical blowing agent, and also some or all of the catalyst. The auxiliaries and additives, and also the flame retardants, are already within the polyol blend.

The amount used of the blowing agent or of the blowing agent mixture is from 1 to 45% by weight, preferably from 1 to 30% by weight, particularly preferably from 1.5 to 20% by weight, based in each case on the entirety of components B to E.

If water, formic acid, or a formic-acid-water mixture is used as blowing agent, the amount of the water, the formic acid, or the formic-acid-water mixture preferably added to the polyol component (i.e. to the mixture of components B to E) is from 0.2 to 10% by weight, based on the total weight of components B to E. Addition of the water, of the formic acid, or of the formic-acid-water mixture can take place in combination with the use of the other blowing agents described. It is preferable to use water in combination with pentane.

Component D

The starting material a*) in the invention comprises, as component D), at least one compound D1) which catalyzes isocyanurate formation and at least one compound D2) which catalyzes polyurethane formation and which differs from the compound D1), where the ratio by weight of the compound D2) to the compound D1) is from 0.75 to 8.

Compound D1 in the invention is a catalyst which catalyzes the trimerization of isocyanates (what is known as a trimerization catalyst). Preferred compounds D1) are carboxylates of alkali metals or of alkaline earth metals, and also ammonium carboxylates, in particular sodium carboxylates, potassium carboxylates, and ammonium carboxylates. Preferred carboxylates are formates, ethylhexanoates, and acetates, in particular formate and acetate, specifically acetate.

Compound D2) in the invention is an aminic catalyst. Examples of compounds suitable as compound D2) are the following: amidines, such as 2,3-dimethyl-3,4,5,6-tetrahydropyrimidine, tertiary amines, such as triethylamine, tributylamine, dimethylcyclohexylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(2-dimethylaminoethyl) ether, bis(dimethylaminopropyl)urea, dimethylpiperazine, 1,2-dimethylimidazole, 1-azabicyclo[3.3.0]octane, and 1,4-diazabicyclo[2.2.2]octane, and alkanolamine compounds, such as triethanolamine, triisopropanolamine, N-methyl- and N-ethyldiethanolamine, N,N-dimethylaminoethoxyethanol, N,N,N'-trimethylaminoethylethanolamine, and dimethylethanolamine.

Particularly suitable compounds D2) are those selected from the group consisting of tertiary amines, such as triethylamine, tributylamine, dimethylcyclohexylamine, dimethylbenzylamine, N,N,N',N'-tetramethylethylenediamine, pentamethyldiethylenetriamine, bis(2-dimethylaminoethyl) ether, dimethylpiperazine, 1,2-dimethylimidazole and alkanolamine compounds, such as triethanolamine, triisopropanolamine, N-methyl- and N-ethyldiethanolamine, N,N-dimethylaminoethoxyethanol, N,N,N'-trimethylaminoethylethanolamine and dimethylethanolamine.

In one particularly preferred embodiment, one or more compounds D2-T) of the following structure is/are used in catalyst component D2):

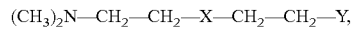

$(CH_3)_2N-CH_2-CH_2-X-CH_2-CH_2-Y$, where $Y=NR_2$ or OH, preferably $Y=N(CH_3)_2$ or OH, particularly preferably $Y=N(CH_3)_2$, and where $X=NR$ or O, preferably $X=N-CH_3$ or O, particularly preferably $X=N-CH_3$. Each R here can be selected independently of each other R, and is an organic moiety of any desired structure having at least one carbon atom. R is preferably an alkyl group having from 1 to 12 carbon atoms, in particular C1-C6-alkyl, particularly preferably methyl and ethyl, in particular methyl.

The proportion by weight of the compounds D2-T), based on catalyst component D2), is preferably at least 25% by weight, with preference at least 50% by weight, with particular preference at least 75% by weight, and in particular 100% by weight.

The ratio by weight of the compound D2) to the compound D1) is preferably at least 0.8; in particular at least 0.9; with preference at least 1, in particular at least 1.1; with particular preference at least 1.2; in particular at least 1.3; with very particular preference at least 1.4; in particular at least 1.5.

The ratio of catalyst component D2) to catalyst component D1) in the invention is at most 8. A higher ratio gives unsatisfactory curing, such that mechanical operations on the foam cannot proceed sufficiently rapidly. It is preferable that the ratio of catalyst component D2) to catalyst component D1) is at most 7, in particular at most 6, with particular preference at most 5, in particular at most 4, with very particular preference at most 3.

Component E

Auxiliaries and/or additives E) can optionally also be incorporated into the reaction mixture for producing the rigid polyurethane foams. Examples that may be mentioned are surfactant substances, foam stabilizers, cell regulators, fillers, dyes, pigments, flame retardants, hydrolysis stabilizers, and fungistatic and bacteriostatic substances.

Examples of surfactant substances that can be used are compounds which serve to promote the homogenization of the starting materials and optionally are also suitable for regulating the cell structure of the plastics. Examples that may be mentioned are emulsifiers, such as the sodium salts of castor oil sulfates, or of fatty acids, and also salts of fatty acids with amines, e.g. diethylamine oleate, diethanolamine stearate, diethanolamine ricinoleate, salts of sulfonic acids, e.g. the alkali metal or ammonium salts of dodecylbenzene- or dinaphthylmethanedisulfonic acid and ricinoleic acid; foam stabilizers, such as siloxane-oxalkylene copolymers and other organopolysiloxanes, ethoxylated alkylphenols, ethoxylated fatty alcohols, paraffin oils, castor oil esters or ricinoleic esters, Turkey red oil, and peanut oil, and cell regulators, such as paraffins, fatty alcohols, and dimethylpolysiloxanes. A suitable method for improving emulsifying effect, cell structure, and/or for stabilizing the foam is moreover to use the oligomeric acrylates described above with polyoxyalkylene and fluoroalkane moieties as side groups. The amounts usually used of the surfactant substances are from 0.01 to 5% by weight, based on 100% by weight of components B to E.

Fillers, in particular reinforcing fillers, are the following conventional materials known per se: organic and inorganic fillers, reinforcing agents, weighting agents, and agents to improve abrasion behavior in paints and coating compositions etc. Individual examples that may be mentioned are: inorganic fillers, such as silicatic minerals, e.g. phyllosilicates, such as antigorite, serpentine, hornblends, amphiboles, chrysotile, talc powder; metal oxides, such as kaolin, aluminum oxides, titanium oxides, and iron oxides, metal salts, such as chalk and baryte, and inorganic pigments, such as cadmium sulfide and zinc sulfide, and also glass, inter alia. It is preferable to use kaolin (China clay), aluminum silicate, and coprecipitates of barium sulfate and aluminum silicate, or else natural and synthetic fibrous minerals, such as wollastonite, or various-length fibers of metal and in particular of glass, where these may optionally have been sized. Examples of organic fillers that can be used are: carbon, melamine, colophony, cyclopentadienyl resins, and graft polymers, and also cellulose fibers, polyamide fibers, polyacrylonitrile fibers, polyurethane fibers, and polyester fibers based on aromatic and/or aliphatic dicarboxylic esters, and in particular carbon fibers.

The inorganic and organic fillers can be used individually or in the form of mixtures, and amounts of these advantageously incorporated into the reaction mixture are from 0.5 to 50% by weight, preferably from 1 to 40% by weight, based on the weight of components A to E, where the content of mats, nonwovens, and wovens made of natural and synthetic fibers can however reach values up to 80% by weight.

Organic phosphoric and/or phosphonic esters can be used as flame retardants. It is preferable to use compounds that are inert toward isocyanate groups. Among the preferred compounds are also phosphoric esters comprising chlorine. Examples of suitable flame retardants are tris(2-chloropropyl)phosphate, triethyl phosphate, diphenyl cresyl phosphate, diethyl(ethane)phosphinate, tricresyl phosphate, tris(2-chloroethyl)phosphate, tris(1,3-dichloropropyl)phosphate, tris(2,3-dibromopropyl)phosphate, tetrakis(2-chloroethyl)ethylenediphosphate, dimethyl methanephosphonate, diethyl diethanolaminomethylphosphonate, and also commercially available halogenated flame-retardant polyols.

It is also possible to use, alongside the above, flame retardants comprising bromine. Flame retardants used comprising bromine are preferably compounds which are reactive toward the isocyanate group. Examples of compounds of this type are esters of tetrabromophthalic acid with aliphatic diols, other examples being alkoxylation products of dibromobutenediol. It is also possible to use compounds that belong to the group of the brominated neopentyl compounds comprising OH groups.

Compounds that can also be used, other than the abovementioned halogen-substituted phosphates, for providing flame retardancy to the polyisocyanate polyaddition products are inorganic or organic flame retardants such as red phosphorus, aluminum oxide hydrate, antimony trioxide, arsenic oxide, ammonium polyphosphate, and calcium sulfate, expandable graphite, or cyanuric acid derivatives, e.g. melamine, or a mixture of at least two flame retardants, e.g. ammonium polyphosphates and melamine, and other compounds that may optionally be used are corn starch or ammonium polyphosphate, melamine, and expandable graphite, and/or optionally aromatic polyesters. It has generally proven advantageous to use from 5 to 50% by weight, preferably from 5 to 25% by weight, of the flame retardants mentioned for every 100% by weight of components B to E.

Further details concerning the abovementioned other conventional auxiliaries and additives can be found in the technical literature, for example in Kunststoff-Handbuch, Polyurethane, Band VII [Plastics handbook, Polyurethanes, volume VII], Hanser-Verlag, Munich, Vienna, $3^{rd}$ edition, 1993.

The expression isocyanate index means the equivalent ratio of isocyanate groups to groups reactive toward isocyanate, multiplied by 100. By way of example, an isocyanate index of 70 means that there are 0.7 reactive NCO groups in component A) for each reactive OH group in components B) to E), or that there are 1.43 reactive NCO groups in components B) to E) for each reactive NCO group in component A).

The manner of use of components A) and B) to E) in the invention is such that the isocyanate index is at least 180. It is preferable that the isocyanate index is at least 200, in particular at least 250, with particular preference at least 300, in particular at least 350. It is thus possible on the one hand to achieve the high surface quality of the invention for the layer made of rigid foam, and on the other hand the catalyst mixture used in the invention, in conjunction with the indices mentioned, can give particularly advantageous reactivity in the twin-belt process. For technical reasons, there is an upper limit on the isocyanate index, which is typically at most 1000, preferably at most 800, in particular at most 600, with particular preference at most 500.

Applicator Apparatus

The application process in the invention is achieved by means of a fixed applicator apparatus. It is particularly preferable that said fixed applicator apparatus is composed of at least one tube c) provided with apertures f) and fixedly attached in essence parallel to the outer layer b) and in essence at right angles to the direction of movement of the outer layer b).

The at least one tube is particularly preferably attached parallel to the outer layer b) and at right angles to the direction of movement of the outer layer b). For the purposes of the process of the invention, the at least one tube c) is a fixed tube, i.e. the angle between the longitudinal axis of the tube(s) and the direction of movement of the outer layer is constant and in essence a right angle, or is constant and is a right angle. It is possible to use, as applicator apparatus, one tube or preferably a plurality of tubes attached alongside one another in a longitudinal direction.

The application apparatus is known from the prior art and is described by way of example in WO 2009/077490, the entire content of which is incorporated by way of reference into the present invention. The application apparatus is hereinafter also termed rake applicator.

In one preferred embodiment, the arrangement of at least two tubes c) provided with apertures f) is in particular such that they form a straight line. It is preferable to use from 2 to 4, particularly preferably from 2 to 3, and in particular 2, tubes c) as application apparatus (rake applicator).

The rake applicator of the invention has, as described, a shape similar to that of a tube, with holes on the underside, distributed across the entire length, and with the reaction mixture intake either at one end of the tubes c) or preferably in the middle of these. If a plurality of tubes c) are used, it is preferable that the intake method used is identical for all of the tubes c).

The tubes c), or the tubes c) arranged alongside one another in a longitudinal direction, can together have a length which is equal to the width of the outer layer b). It is preferable that the length of the tube or of the tubes c) attached alongside one another in a longitudinal direction is smaller than the width of the outer layer b), in order to ensure that none of the reaction mixture is applied alongside the outer layer b). The arrangement here has the rake applicator in the middle over the outer layer b). It is preferable that the rake applicator covers at least 70% of the width of the outer layer b). If the width of the outer layer b) is 1.2 m, as is conventional for sandwich elements, there would be a width of 25 cm not covered by the rake applicator on each side in this case.

It is preferable that the rake applicator covers at least 70%, particularly preferably at least 80%, and in particular at least 95%, of the width of the outer layer b).

It is preferable that the height of the rake applicator above the outer layer b) is from 5 to 30 cm, preferably from 10 to 30 cm, in particular from 15 to 25 cm.

The number of apertures f) along the tube c) or along each tube c) is, depending on the length of the tube c), at least 2, preferably at least 6, particularly preferably from 10 to 50, and in particular from 20 to 40. It is preferable that the number of holes is an even number.

The diameters of the apertures f) are in the range from 0.5 to 10 mm, preferably from 1.0 mm to 4 mm. The distances of the apertures f) from one another are preferably from 5 to 200 mm, particularly preferably from 5 to 60 mm, and in particular from 10 to 30 mm. The distance, and the diameter, is preferably identical across the entire length of the tube c).

The internal diameter of the tube c), or of each tube, is from 0.2 to 5 cm, preferably from 0.3 to 2.5 cm, and in particular from 0.2 to 2 cm.

In one particularly preferred embodiment, the length of the apertures f) along the length of the tube c), or tubes c) to the extent that a plurality of tubes are used, is different. The expression length of the apertures f) means the distance that the mixture a*) has to travel from the interior of the tube c) until it is discharged from the tube c). This can be achieved in various ways. Firstly, the internal diameter of the tube c) can be altered. This is not preferred, since components of this type are difficult to produce and to clean.

It is preferable that the length of the apertures f) is altered by attaching one or more components at the underside of the tube c) in such a way that the length of the holes varies in the desired manner. This measure actually changes the wall thickness of the tube c). The manner in which the hole lengths decrease, from the location of input of the starting material a*) for the isocyanate-based rigid foam to the end, is not linear, but instead is exponential. The manner of lengthening of the apertures f) is usually such that the length decreases in the direction from the input of the mixture a*) to the ends of the tube c). When the input for the mixture a*) is in the middle of the tube c), therefore, the length of the apertures f) decreases in the direction toward the edges. When the input for the mixture a*) is at the edge of the tube c), the length of the apertures f) decreases in the direction from the input side to the other side.

In particular, the rake applicator, which is preferably composed of plastic, can be produced from a single component, i.e. in one piece. The length of the apertures varies as in the descriptions above, in that the lengths of the apertures are adapted appropriately by using tubular extensions at the underside of the tube.

The length of the apertures f) is preferably to be selected in such a way that the ratio of the length of the apertures f) from the edge to the middle for each pipe c) is from 1.1 to 10. The ratio is particularly preferably from 2.5 to 10, in particular from 5 to 10.

If a plurality of tubes c) are used, the variation of the length of the apertures f) is designed identically for all of the tubes c). Each of the tubes c) provided with apertures f) has connection to mixing equipment for the mixing of components of the flowable starting material a*) for the isocyanate-based rigid foam. This is usually achieved by means of an input d) and e) situated therebetween. This takes the form of a tube, and if a plurality of tubes c) are used, each has connection to the input. This can be achieved via a tube from which in turn there are connecting tubes running outward to the tubes c).

The diameter of the inputs d) is preferably constant. It is preferably from 4 to 30 mm, particularly preferably from 6 to 22 mm.

The design of the process of the invention is preferably such that the amount of the flowable starting material a*) applied to the outer layer b) for the isocyanate-based rigid foam is from 2 kg/min to 100 kg/min, preferably from 8 kg/min to 60 kg/min.

The viscosity at 25° C. of the flowable starting material a*) for the isocyanate-based rigid foam is preferably from 100 mPa*s to 4000 mPa*s, particularly preferably from 100 mPa*s to 3500 mPa*s, in particular from 200 to 2000 mPa*s.

The process of the invention is particularly suitable for foams with a short cream time for the system. The cream time for the systems used for the process of the invention is preferably below 15 s, with preference below 12 s, with particular preference below 10 s, and in particular below 8 s, while the fiber time for the system is from 20 to 60 s. The expression cream time means the time between the mixing of the polyol component and isocyanate component and the start of the urethane reaction. The expression fiber time means the time from the mixing of the starting components for the foams to the juncture at which the reaction product is no longer flowable. The fiber time is adapted to be appropriate to the element thickness produced, and also to the speed of the twin belt.

It is preferable that the rigid foams of the invention are produced in continuously operating twinbelt systems. In these, a high-pressure machine is used to mix the polyol component and the isocyanate component and to meter these in a mixing head. Separate pumps can be used in advance to meter catalysts and/or blowing agents into the polyol mixture.

The reaction mixture is applied continuously to the lower outer layer. The upper outer layer and the lower outer layer with the reaction mixture run into the twin-belt system. In this, the reaction mixture foams and hardens. Once the material has left the twin-belt system, the continuous strand is cut apart to give the desired dimensions. It is thus possible to produce sandwich elements with metallic outer layers or insulation elements with flexible outer layers.

The starting components are mixed at a temperature of from 15 to 90° C., preferably of from 20 to 60° C., in particular of from 20 to 45° C. The reaction mixture can be poured into closed supportive molds by high- or low-pressure metering machinery. This technology is used by way of example to manufacture discrete sandwich elements.

The density of preferred layers made of rigid polyurethane foam is from 0.02 to 0.75 g/cm$^3$, preferably from 0.025 to 0.24 g/cm$^3$, and in particular from 0.03 to 0.1 g/cm$^3$. The materials are particularly suitable as insulation material in the construction sector and in the sector of refrigerators and freezers, for example in the form of intermediate layer for sandwich elements, or for foams for insertion into refrigerator casings and chest-freezer casings.

The PU rigid foams produced by the process of the invention exhibit good surfaces with few defects, good adhesion, and good curing. At the same time, the mixture formed from components B) to E) has good shelf life of a number of months at 20° C. or 5° C.

EXAMPLES

The invention will be explained in more detail by using the examples below.

The isocyanate index used for reacting the isocyanates and the components reactive toward isocyanate together with the blowing agents, catalysts and all of the other additives was 370.
The following polyol component was used in all of the experiments:
58 parts by weight of a polyester alcohol composed of the esterification product of terephthalic acid, glycerol, diethylene glycol, and oleic acid, with a hydroxy functionality of 2.3 and a hydroxy number of 245 mg KOH/g.
10 parts by weight of a polyether alcohol with a hydroxy functionality of 2 and a hydroxy number of 190 mg KOH/g, produced via polyaddition of propylene oxide onto ethylene glycol.
30 parts by weight of tris-2-chloroisopropyl phosphate.
2 parts by weight of Tegostab® B8498 from Goldschmidt, a copolymer with comb structure with a main chain based on polydimethylsiloxane and polyether side chains.

Production of Sandwich Elements:

Sandwich elements of thickness 100 mm were produced with aluminum foil of thickness 0.05 mm as outer layers in the twin-belt process. Two fixed tubes arranged alongside one another, each of length 560 mm, were used as applicator apparatus, having been attached parallel to the outer layer at a distance of 90 mm and at right angles to the direction of movement of the outer layer, and in each case having 14 apertures. The flowable starting material was introduced in the middle of the tubes c), and the length of the apertures of the tube decreased from the middle of the tube to the ends thereof. The total amount discharged of the reaction mixture was 21.0±0.5 kg/min.

Example 1

(Comparison)

Further Constituents of the Polyol Component:
0.6 part by weight of water
3.5 parts by weight of Dabco TMR-2 (50% by weight solution of a tertiary ammonium formate in dipropylene glycol; i.e. content of catalytically active salt: 1.75 parts by weight)
1.2 parts by weight of dimethylcyclohexylamine
about 20 parts by weight of c-Pentane70 (mixture of 70% of cyclopentane and 30% of isopentane)
Isocyanate Component:
Lupranat® M50 (polymeric methylenediphenyl diisocyanate (PMDI), with a viscosity of about 500 mPa*s at 25° C. from BASF SE)

The discharge of the flowable reaction mixture a*) was calculated in such a way as to give a theoretical overall envelope density of 30±1 g/L. The liquid envelope density here was adjusted to 32+/−1 g/L by varying the amount of about 20 parts by weight of c-pentane while water content was constant at 0.6 part by weight. Fiber time was also adjusted to 30+/−1 s by slightly varying the amount of dimethylcyclohexylamine.

Example 2

Of the Invention

The isocyanate index used for reacting the isocyanates and the components reactive toward isocyanate together with the blowing agents, catalysts and all of the other additives was 370.
Further constituents of the polyol component:
0.6 part by weight of water
1.6 parts by weight of potassium acetate solution (47% by weight in ethylene glycol; i.e. content of catalytically active salt: 0.8 part by weight)
1.0 part by weight of pentamethyldiethylenetriamine
about 20 parts by weight of c-Pentane70 (mixture of 70% of cyclopentane and 30% of isopentane)
Isocyanate Component:
Lupranat® M50 (polymeric methylenediphenyl diisocyanate (PMDI), with a viscosity of about 500 mPa*s at 25° C. from BASF SE)

The discharge of the flowable reaction mixture a*) was calculated in such a way as to give a theoretical overall envelope density of 30±1 g/L. The liquid envelope density here was adjusted to 32+/−1 g/L by varying the amount of c-pentane while water content was constant at 0.6 part by weight. Fiber time was also adjusted to 30+/−1 s by slightly varying the amount of pentamethyldiethylenetriamine.

The resultant sandwich elements were assessed in relation to the surface quality of the applied layer made of rigid foam, by removing the upper and lower outer layer from a rigid foam layer measuring 1 m×2 m and visually assessing and classifying the surface. Table 1 below presents the results.

Comparative Example 3

The formulation in inventive example 2 was used as described below to produce sandwich elements of thickness 100 mm with aluminum foil of thickness 0.05 mm as outer layers, by the twin-belt process.

Applicator apparatus used comprised a tube (rake applicator) of length 25 cm with internal diameter 12 mm, attached parallel to the outer layer and in the direction of running of the belt, and having 41 apertures of diameter 1.8 mm. The apertures had constant length and diameter throughout the length of the tube. The distance of the first aperture from the final aperture was 20 cm. The liquid reaction mixture was introduced at one end of the tube. The amount introduced was 16.5 kg/min+/−0.5 kg/min. During application of the liquid reaction mixture, the rake applicator oscillated over the width of the sandwich element to be produced.

The resultant sandwich elements were likewise assessed in relation to the surface quality of the applied layers made of rigid foam, by removing the upper and lower outer layer from a rigid foam layer measuring 1 m×2 m and visually assessing and classifying the surface.

Table 1 below collates the results:

|  | Comparative example 1 | Inventive example 2 | Comparative example 3 |
|---|---|---|---|
| Foam surface on the side that during production is upward | − | + | − |
| Foam surface on the side that during production is downward | − | + | − | where:
+: no cavities or other surface defects, and no lack of conformity
o: cavities and/or other surface defects, or else slight lack of conformity
−: surface greatly impaired by cavities and/or other surface defects, or else by lack of conformity The results in table 1 show that the frequency of formation of surface defects on the side that during production is upward, at the interface with the metallic outer layer has been markedly reduced in the inventive example.

The invention claimed is:

1. A process for producing a composite element comprising:
at least one outer layer b); and
at least one isocyanate-based rigid foam layer a),
the process comprising applying the isocyanate-based rigid foam layer a) in the form of a flowable starting material a*) to the outer layer b), while the outer layer b) is moved continuously, such that the applying is carried out with a fixed applicator apparatus c),
wherein:
the flowable starting material a*) comprises:
A) at least one polyisocyanate;
B) at least one compound which reacts with isocyanate groups to form urethane;
C) at least one blowing agent;
D) catalysts comprising at least one compound D1) which catalyzes isocyanurate formation and at least one compound D2) which catalyzes polyurethane formation and which differs from the compound D1); and
E) optionally auxiliaries and additives;
the compound D2) comprises at least one amino group;
an isocyanate index of the component A) is at least 180; and
a ratio by weight of the compound D2) to the compound D1) is from 0.75 to 8.

2. The process according to claim 1, wherein compound D1) is selected from the group consisting of an alkali metal carboxylate, an alkaline earth metal carboxylate and an ammonium carboxylate.

3. The process according to claim 1, wherein compound D1) is a carboxylate of an alkali metal.

4. The process according to claim 3, wherein the carboxylate is selected from the group consisting of formate, ethylhexanoate, and acetate.

5. The process according to claim 4, wherein compound D1 is an alkali metal acetate.

6. The process according to claim 1, wherein compound D2) is selected from the group consisting of an amidine, a tertiary amine, and an alkanolamine.

7. The process according to claim 1, wherein component D2) comprises at least one compound D2-T) of the following structure:

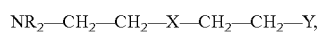

$NR_2-CH_2-CH_2-X-CH_2-CH_2-Y$, wherein $Y=NR_2$ or OH and $X=NR$ or O, such that each R independently represents an organic group having at least one carbon atom.

8. The process according to claim 7, wherein $Y=NR_2$ and $X=NR$ or O, and $R=CH_3$.

9. The process according to claim 7, wherein a proportion of the compound D2-T), based on the total weight of component D2), is at least 50%.

10. The process according to claim 1, wherein the ratio by weight of component D2) to component D1) is at least 1.

11. The process according to claim 1, wherein the ratio by weight of component D2) to component D1) is at most 5.

12. The process according to claim 1, wherein the component B) comprises at least one polyester polyol B1) and at least one polyether polyol B2).

13. The process according to claim 1, wherein a height at which a tube of the apparatus c) provided with apertures f) is attached above the outer layer b) is from 5 to 30 cm.

14. The process according to claim 1, wherein the fixed applicator apparatus c) comprises at least one fixed tube c') provided with apertures f) and attached parallel to the outer layer b) and at right angles to the direction of movement of the outer layer b).

15. The process according to claim 14, wherein the design of the tube is such that the input of the flowable starting material a*) takes place in the middle of the tube c'), and the length of the apertures of the tube c') decreases from the middle of the tube c') toward the ends of same.

16. The process according to claim 1, wherein the viscosity at 25° C. of said flowable starting material a*) for the isocyanate-based rigid foam is from 100 mPa*s to 3500 mPa*s.

* * * * *